June 17, 1952  B. H. BILLINGS  2,600,962
TUNABLE NARROW BAND OPTICAL FILTER
Filed Oct. 9, 1948  2 SHEETS—SHEET 1

INVENTOR
Bruce H. Billings
BY
Donald C. Dixon
Attorney

Patented June 17, 1952

2,600,962

UNITED STATES PATENT OFFICE 2,600,962

TUNABLE NARROW BAND OPTICAL FILTER

Bruce H. Billings, Cambridge, Mass., assignor to Polaroid Corporation, Cambridge, Mass., a corporation of Delaware Application October 9, 1948, Serial No. 53,703

10 Claims. (Cl. 88—65)

This invention relates to optical filters and more particularly to filters having transmission bands whose width and position on the spectrum can be precisely controlled.

It has heretofore been proposed to form filters of the polarization interference type having wide apertures and relatively narrow transmission bands. These filters comprise a plurality of superposed components, each component comprising suitable birefringent members located between parallel or crossed polarizers. Such filters and the theory of the optics thereof have been described by Lyot in Comptes Rendus, 197, 1593 (1933), and by J. Evans, pub. Astro. Soc. Pac. 52, 305 (1940). It is one object of the present invention to provide improved filters of this type of a relatively simple construction which can be so controlled that the transmission, i. e., "pass" bands thereof can be shifted at will over a considerable range of wavelength.

Other objects are the provision of a novel polarization interference filter comprising a plurality of superposed "channel spectra" producing components wherein each of said components includes a stress-responsive birefringent element and there is associated with each said element a stress-applying mechanism for selectively controlling the wave-retardation characteristics of said element; wherein the birefringent element is responsive to electrical stress and the stress-applying mechanism subjects said element to an electrical field; wherein a common control simultaneously operates the stress-applying mechanisms associated with each said element; and wherein said elements of varying birefringence are associated with elements of fixed birefringence to provide the wave-retardation members of the several components of the filter.

These and other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein.

According to the present invention there is provided a novel optical filter of the polarization interference type. It comprises a multiplicity of components, each of which includes a pair of polarizers having their transmission axes parallel to each other and a wave retardation member, which member may comprise one or more elements of suitable birefringent media. The several components are aligned along a suitable optical axis and adjacent components may share one of their polarizers and it is accordingly to be expressly understood that the reference herein made to the polarizers of the components of the filters are not to be construed as requiring a separate pair of polarizers for each component.

The effective thicknesses of the wave-retardation members of the successive superposed components of the filter are preferably in the ratio of 1:2:4 etc. The thickest wave-retardation member predetermines the width of the pass bands and it becomes possible to obtain transmission bands as narrow as desired. For example, the transmission bands may range from a fraction of an Angstrom to several hundred Angstroms in width. By suitably selecting the number of components and the wave-retardation characteristics thereof, not only can the width of the pass bands be precisely controlled but it is also possible to control the separation of the bands with respect to one another. For a fuller understanding of the optics of the filters of this general type, reference may be had to the aforementioned publications of Lyot and Evans and to applicant's paper published in the Journal of the Optical Society of America, vol. 37, No. 10, pages 738–746 (October 1947).

According to the present invention the wave-retardation members of the several components of the filter are so constructed as to have their wave-retardation characteristics subject to precise variation within a range of at least one-half wavelength whereby the position of the pass bands of the filter on the spectrum can be shifted at will throughout a wavelength range equal to the spacing of the successive pass bands. The birefringent members of the several components of the filter are such that their birefringent characteristics can be varied merely by the application of a suitable stress, electrical or mechanical, thereto. This makes for a simple and rapid shifting of the position of the pass bands and thus provides a tunable narrow band optical filter that can be readily and simply controlled.

Figure 1:
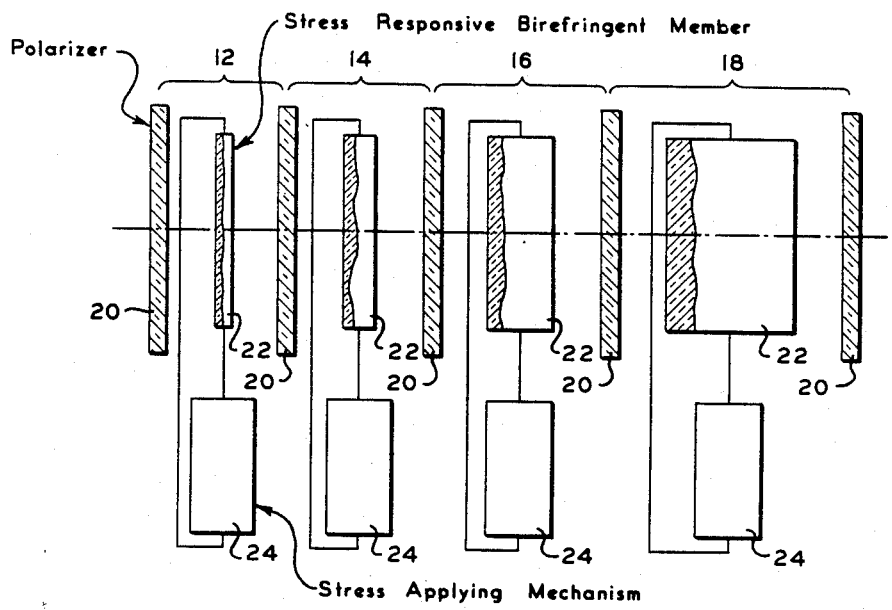
Figure 1 is a schematic view of one embodiment of a tunable filter embodying the present invention, said filter comprising four components.

Referring to Figure 1 of the drawings, there is shown schematically an embodiment of the filter means of the present invention which comprises four components 12, 14, 16 and 18, each of said components comprising a pair of parallel polarizers 20 on opposite sides of a stress-responsive birefringent member 22. It will be observed that each component shares a polarizer with the component which it adjoins although it is equally possible to have two separate polarizers for each of the components. Associated with each of the birefringent members of each component there is a stress-applying means 24, which may be electrical or mechanical, which may be operated to effect a selective change in the wave-retardation characteristic of the birefringent member with which it is associated.

Figure 2:
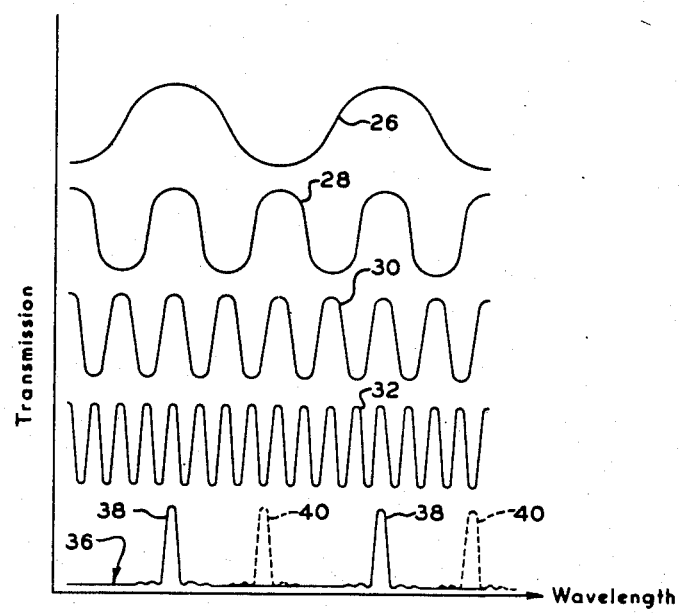
Fig. 2 shows the transmission characteristics of the several components of a filter of the type illustrated in Fig. 1 and also the sum of the transmission characteristics of the several components, the transmissions being plotted as ordinates and the wavelengths as abscissas.

In Fig. 2 of the drawings there is shown graphically the transmission characteristics of the several components of the filter of Fig. 1 and also the transmission characteristics of the filter as a whole. The curve 26 represents the transmission characteristics of the first component 12 of the filter, the curve 28 represents the transmission characteristics of the second component 14, the curve 30 the transmission characteristics of the third component 16, and the curve 32 the transmission characteristics of the fourth component 18.

The effective retardation thickness of the birefringent members or plates 22 of the several components 12, 14, 16 and 18 of the foregoing filter is approximately in the ratio of 1:2:4:8. The effect of bringing together these components in a polarization interference filter is to give composite characteristics which are represented by curve 36 wherein 38 represents the relatively narrow, widely spaced pass bands of the filter. According to the present invention, the position of these pass bands can be shifted (for example, to the position shown in broken lines at 40) by suitably operating the stress-applying means 24.

The peak transmission of the filter will depend on the type of polarizing and birefringent elements which are used. For example, with a many-component filter, e. g., a filter having five or more components, using sheet polarizers, and in which the elements of the various components and the components themselves are separated by air spaces, the peak transmission may be of the order of 10%. With quartz or calcite polarizers and a laminated construction, the peak transmission may be as high as 35%. The angular aperture of the filter will depend to a considerable extent on the narrowness of the desired pass band. For filters having pass bands of several hundred Angstroms in width the angular aperture may be of the order of 20° total field whereas for filters having a pass band of a width of one Angstrom the angular field may be of the order of a degree.

Figure 3:
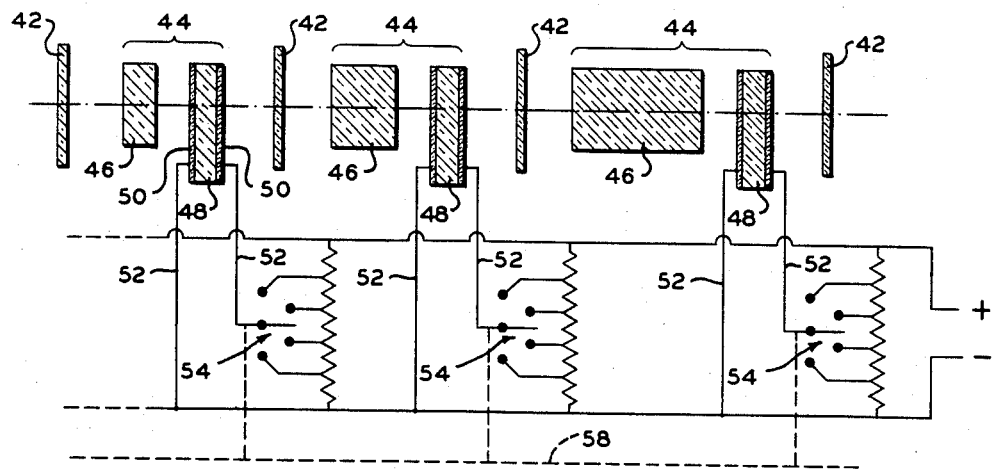
Fig. 3 is a schematic view of a three-element tunable filter embodying electrical means for controlling the position of the transmission bands.

One specific embodiment of the filter of the present invention is illustrated schematically in Fig. 3 and, as shown, comprises three channel spectra-producing components, each of which comprises a pair of parallel polarizers 42 and a birefringent or wave-retardation member 44. As shown, each of wave-retardation members 44 comprises two superposed birefringent elements 46 and 48. Birefringent elements 48 of said components are alike, whereas birefringent elements 46 are preferably formed of the same material but vary in thickness so that their wave-retardation properties are different. The birefringent elements 46 and 48 of each of birefringent members 44 impart to said members the desired wave-retardation ratio of approximately 1:2:4. In the form shown, each of elements 46 may be formed, for example, of quartz, and each of elements 48 is preferably formed of a material whose birefringence changes when subjected to the action of an electric field of varying potential. An example of one such material is crystalline $NH_4H_2PO_4$ which is commercially available as PN, being grown and sold by the Brush Development Company of Cleveland, Ohio, under this trade name. This crystal has a high electro-optic effect and in particular it exhibits a strong longitudinal effect. For fields applied parallel to the direction of light propagation and at the same time parallel to the optical axis, there is a strong induced birefringence. In this crystal the effect is linear with field strength, and since the light path and field strength are in the same direction the effect becomes linear with voltage and substantially independent of thickness.

In the specific structure shown in Fig. 3 there is associated with each of elements 48 a suitable means for applying an electrical field of controlled potential to crystal 48. A pair of transparent electrodes 50 formed, for example, of glass coated with stannous oxide films are connected to opposite faces of each of crystals 48. Pairs of leads 52 connect each pair of said electrodes through a voltage-controlling device diagrammatically represented at 54 to a common source of electrical energy 56. The voltage regulators as shown are variable resistances and a single control 58 is preferably provided for simultaneously operating all of the resistances whereby the same voltage change may be obtained in each of the birefringent members by means of a single operation. This simple resistance network for controlling the voltages applied to crystal 48 gives the desired variation in the wave-retardation characteristics of said crystals. In the form shown, each variable resistance 54 has four resistance positions and with such resistances the filter of Fig. 3 may have its pass bands set to four discrete wavelengths. By suitably selecting the mechanism for controlling the line voltage applied to each of the crystals 48 it becomes readily possible to provide as many separate discrete positions for the pass bands of the filter as is desired.

Other crystals may be substituted for the PN crystal of element 48, for example such other phosphates as ammonium dihydrogen phosphate (ADP), potassium dihydrogen phosphate (KDP), as well as rubidium dihydrogen phosphate may be employed. Various other crystalline substances may also be used including, among others, calcium dichromate, tartaric acid, magnesium sulphate, hydrated zinc sulphate, calcium ditartrate, Rochelle salt, ammonium magnesium phosphate, barite, wulfenite (lead molybdate), sodium aluminum silicate, ammonium chloride, zinc sulfide, boracite. A more complete table of suitable crystals maybe be found in the inaugural dissertation of Franz von Okolicsanyi, Nurnberg 1935, particularly pages 11, 12, etc. thereof. These preferred materials are in general crystalline materials which have a high stress optical, particularly a high electro-optical, coefficient responding practically instantaneously to any change in an impressed field whether effected mechanically, electrically, magnetically or otherwise. A Kerr cell may also be substituted for each of crystals 48.

Figure 4:
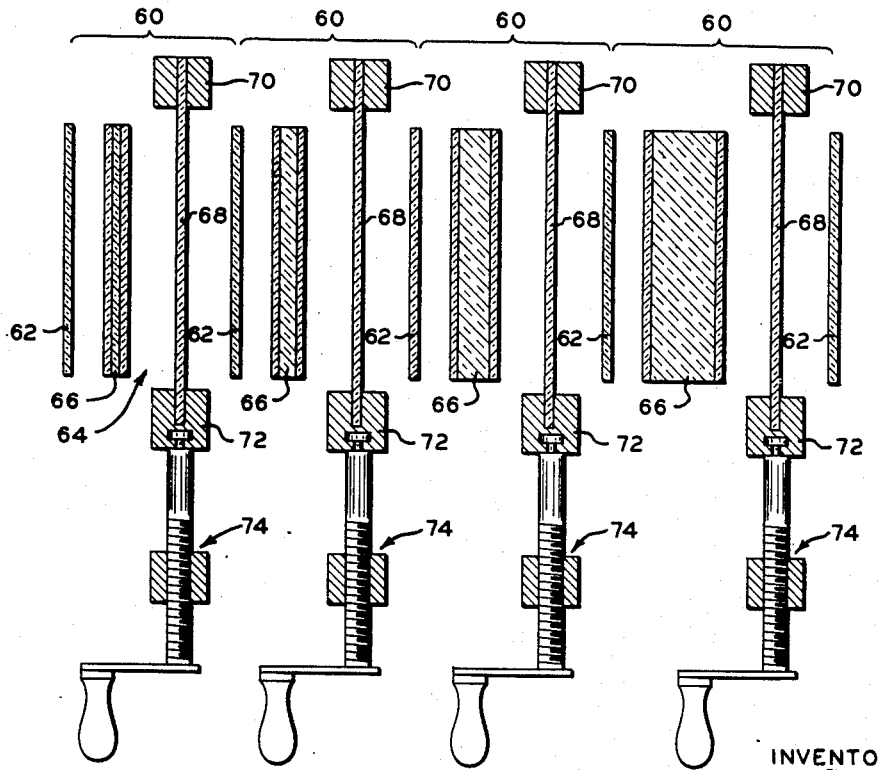
Fig. 4 is a schematic view of a further modification of the filter of the invention wherein the birefringent elements are subjected to mechanical stress in order to vary the wave retardation characteristics thereof.

As hereinbefore pointed out it is also possible to use birefringent materials whose birefringence may be varied by the application of a mechanical stress thereto. Typical of such materials are the linear high molecular weight polymers such as the vinyl plastics. It is well known that films of such plastics, when stretched, will show birefringence and that the birefringence thereof will vary with the amount of stress applied thereto. An embodiment of the invention which includes in its channel spectra component wave-retardation members having sheets of plastic as their birefringent media is illustrated in Fig. 4 and, as shown, has the channel spectra component 60 thereof comprising parallel polarizers 62 and a birefringent member 64, the latter comprising a pair of superposed stretched plastic films 66 and 68. Plastic film 66 provides the fixed wave-retardation element and plastic film 68 provides the variable wave-retardation element of the birefringement member 64.

Element 66 may be formed, for example, by laminating a sheet of stretched polyvinyl alcohol between glass plates. For effecting the lamination, a suitable acrylic acid resin may be used such, for example, as the Acryloid F-10 made and sold by the Resinous Products Company in Philadelphia. The stretched plastic sheets of each of elements 66 of the several components 60 of the filter vary in their birefringence to give an approximation of the desired wave retardation ratio.

Plastic sheets 68 may be sheets of polyvinyl butyral or polyvinyl butyrate plasticized with 15% butyl sebacate and are preferably so mounted as to be under mechanical stress and so that said mechanical stress may be varied at will. For example, each of sheets 68 may be secured at one end in a suitable fixed clamp 70 and at the other end in an adjustable clamp 72, the adjustment of the position of the latter clamping member varying the stretch to which the sheet is subjected. Suitable adjusting means for the latter clamp may be provided, such as a screw arrangement 74. If desired, a common control may be provided for each of the adjusting elements 74 so that a single operation can simultaneously vary the birefringence of all of the elements 68.

The thinnest of elements 66 of this filter preferably has a retardation of two waves in the green. The ratio characteristics of the four elements 66 need not be precisely 1:2:4:8. For example, a satisfactory filter is obtained if the retardation characteristics of these elements are as follows: 8880 mu; 4480 mu; 2250 mu and 1050 mu. Without the birefringent elements 68 in the system, that is in its fixed filter position, the filter has a two-wave transmission band in the green. From its position in the green the aforementioned transmission band can be tuned by varying the birefringence of elements 68 over a range which is equivalent to the separation between it and the next successive pass band of the fixed filter. Although as the filter pass band is shifted further from the fixed filter position by such variation of the birefringence of elements 68 the ratio of retardation in the individual components 60 is more and more upset, it has been determined that this upsetting of ratio does not give rise to any extraneous pass bands.

Although in each of the foregoing examples the birefringent member of the channel spectra components comprises two elements, one of which has fixed wave-retardation characteristics and the other of which is so arranged that its birefringence can be varied, it is to be expressly understood that a single birefringent element of satisfactory wave-retardation characteristics may be substituted for the pair of elements of the foregoing examples and there may be associated with said single element a suitable stress-applying mechanism for effecting variation changes in the wave-retardation characteristics of the element of a magnitude up to one-half wavelength.

There is thus provided a filter whose transmission peak is equivalent to the corresponding retardation of the thickest wave retardation member of the several components of the filter. The filter is tuned to vary the retardation of each birefringent member of the components so that its nearest transmission peak is shifted to the point at which the overall transmission is to be a maximum. In order to do this it is only necessary to vary the wave-retardation characteristics of the birefringent members of the components not more than a half wavelength. By virtue of this relatively small variation it becomes possible to shift the pass bands to any position in the wavelength range which separates the transmission bands in the fixed transmission position of the filter.

The novel filter of the invention provides a new tool for the observation of various optical phenomena and may be used in many fields. There are, for example, many applications in colorimetry and color reproduction for a filter having a pass band of approximately 100 A. in width which can be tuned in discrete jumps through the visible spectrum. It also becomes possible to apply the filter to analyze three dimensional motion of solar prominences and with filters having very narrow pass bands to analyze the fine structure of Raman lines.

Of particular utility are the filters whose pass bands may be almost instantaneously varied from one position of the spectrum to another, that is, those filters which are tuned by the application of an electrical force, e. g., the filter of Fig. 3. With the high speed provided by such tuning methods it becomes possible to make spectral analyses of very short-lived phenomena, such as the discharge of an Edgarton lamp. The presentation, on cathode ray oscillographs, of these and other absorption or emission spectra becomes relatively simple with an electrically tuned filter of the type herein described. Such cathode ray tube spectral analyses may be very useful for the very quick investigation of series of dyes or for process control which involve spectral transmission curves. The electrically tuned filter could also be applied to sequential color television.

It is to be expressly understood that the term "stress responsive" as used herein with respect to the birefringent elements includes all materials in which birefringence can be electrically, mechanically or magnetically induced as by the application of a mechanical force or an electrical field or a magnetic field and irrespective of whether the material is physically distorted, as by compression, or remains physically unaltered as the stress is applied.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A tunable, narrow-band, optical filter of the polarization interference type having discrete transmission bands and a relatively wide aperture, said filter comprising a multiplicity of polarizers and a multiplicity of birefringent members so arranged as to provide a plurality of superposed channel spectra-producing components, a polarizer being located on each side of said birefringent members, each said birefringent member comprising at least one stress-responsive birefringent element capable of having the wave retardation characteristics thereof varied by the application of a stress thereto, the birefringent member of each said channel spectra-producing component following the first component having an effective wave retardation thickness approximately twice that of the preceding birefringent member, said channel spectra-producing component acting to transmit light over narrow, widely spaced bands of the optical spectrum, stress-applying means physically connected to each of said stress-responsive elements and capable of applying a predetermined stress thereto, said stress-applying means being so connected to said stress-responsive elements that each said stress-responsive element is maintained by said stress-applying means under a uniform stress over its entire effective light-transmitting area so as to be uniformly birefringent throughout said area, and means for controlling the operation of said stress-applying means to vary the stress applied to said elements, said controlling means being operative, by varying the stress applied to said elements, to change the wave retardation characteristics of said members by not more than approximately one-half wavelength so as to shift the position of the transmission bands of said filter along the spectrum.

2. A tunable, narrow-band, optical filter of the polarization interference type having discrete transmission bands and a relatively wide aperture, said filter comprising a multiplicity of polarizers and a multiplicity of birefringent members so arranged as to provide a plurality of superposed channel spectra-producing components, a polarizer being located on each side of said birefringent members, each said birefringent member comprising at least one stress-responsive birefringent element capable of having the wave retardation characteristics thereof varied by the application of a mechanical stress thereto, the birefringent member of each said channel spectra-producing component following the first component having an effective wave retardation thickness approximately twice that of the preceding birefringent member, said channel spectra-producing component acting to transmit light over narrow, widely spaced bands of the optical spectrum, stress-applying means connected to each of said elements and capable of applying a predetermined mechanical stress thereto, said stress-applying means being so connected to said stress-responsive elements that each stress-responsive element is maintained by said stress-applying means under a uniform stress over its entire effective light-transmitting area so as to be uniformly birefringent throughout said area, and means for controlling the operation of said stress-applying means to vary the stress applied to said elements, said controlling means being operative, by varying the stress applied to said elements, to change the wave retardation characteristics of said members by not more than approximately one-half wavelength so as to shift the position of the transmission bands of said filter along the spectrum.

3. A tunable, narrow-band, optical filter of the polarization interference type having discrete transmission bands and a relatively wide aperture, said filter comprising a multiplicity of polarizers and a multiplicity of birefringent members so arranged as to provide a plurality of superposed channel spectra-producing components, a polarizer being located on each side of said birefringent members, each said birefringent member comprising at least one sheet of plastic capable of being stretched and when stretched of having the wave retardation characteristics thereof changed, the birefringent member of each said channel spectra-producing component following the first component having an effective wave retardation thickness approximately twice that of the preceding birefringent member, said channel spectra-producing component acting to transmit light over narrow, widely spaced bands of the optical spectrum, stress-applying means connected to each of said sheets of plastic and capable of maintaining said plastic in stretched condition, said stress-applying means being so connected to said sheets of plastic that each said sheet of plastic is maintained by said stress-applying means under a uniform stress over its entire effective light-transmitting area so as to be uniformly birefringent throughout said area, and means for controlling the operation of said stress-applying means to vary the stretch applied to said plastic sheets, said control means being operative, by varying the stretch applied to said sheets, to change the wave retardation characteristics of said members by not more than approximately one-half wavelength so as to shift the transmission bands of said filter along the spectrum.

4. A tunable, narrow-band, optical filter of the polarization interference type having discrete transmission bands and a relatively wide aperture, said filter comprising a multiplicity of polarizers and a multiplicity of birefringent members so arranged as to provide a plurality of superposed channel spectra-producing components, a polarizer being located in each side of said birefringent members, each said birefringent member comprising at least one stress-responsive birefringent element capable of having the wave retardation characteristics thereof varied by the application of an electrical field thereto, the birefringent member of each said channel spectra-producing component following the first component having an effective wave retardation thickness approximately twice that of the preceding birefringent member, said channel spectra-producing component acting to transmit light over narrow, widely spaced bands of the optical spectrum, stress-applying means connected to each of said elements and capable of applying a predetermined electrical field thereto, said stress-applying means being so connected to said stress-responsive elements that each said stress-responsive element is maintained by said stress-applying means under a uniform stress over its entire effective light-transmitting area so as to be uniformly birefringent throughout said area, and means for controlling the operation of said stress-applying means to vary the voltage applied to said elements, said control means being operative, by varying the voltage applied to said elements, to change the wave retardation characteristics of said members by not more than approximately one-half wavelength so as to shift the position of the transmission bands of said filter along the spectrum.

5. A tunable, narrow-band, optical filter of the polarization interference type having discrete transmission bands and a relatively wide aperture, said filter comprising a multiplicity of polarizers and a multiplicity of birefringent members so arranged as to provide a plurality of superposed channel spectra-producing components, a polarizer being located on each side of said birefringent members, each said birefringent member comprising at least one crystal having a high electro-optical coefficient, the birefringent member of each said channel spectra-producing component following the first component having an effective wave retardation thickness approximately twice that of the preceding birefringent member, said channel spectra-producing component acting to transmit light over narrow, widely spaced bands of the optical spectrum, electrical means connected to each of said crystals and capable of applying a predetermined voltage thereto, said stress-applying means being so connected to said crystals that each said crystal is maintained by said stress-applying means under a uniform stress over its entire effective light-transmitting area so as to be uniformly birefringent throughout said area, and means for controlling the operation of said voltage-applying means to vary the voltage applied to each crystal, said controlling means being operative, by varying the voltage applied to said crystals, to change the wave retardation characteristics of said members by not more than approximately one-half wavelength so as to shift the position of the transmission bands of said filter along the spectrum.

6. A tunable, narrow-band, optical filter of the polarization interference type having discrete transmission bands and a relatively wide aperture, said filter comprising a multiplicity of polarizers and a multiplicity of birefringent members so arranged as to provide a plurality of superposed channel spectra-producing components, a polarizer being located on each side of said birefringent members, each said birefringent member comprising at least one Kerr cell, the birefringent member of each said channel spectra-producing component following the first component having an effective wave retardation thickness approximately twice that of the preceding birefringent member, said channel spectra-producing component acting to transmit light over narrow, widely spaced bands of the optical spectrum, electrical means connected to each of said cells and capable of applying a predetermined voltage thereto, said eletrical means being so connected to said cells as to apply a uniform voltage over the entire effective light-transmitting area of each cell so as to maintain said cell uniformly birefrigent throughout said area, and means for controlling the operation of said voltage-applying means to vary the voltage applied to each cell, said controlling means being operative, by varying the voltage applied to said cells, to change the wave retardation characteristics of said members by not more than approximately one-half wavelength so as to shift the position of the transmission bands of said filter along the spectrum.

7. A tunable, narrow-band, optical filter of the polarization interference type having discrete transmission bands and a relatively wide aperture, said filter comprising a multiplicity of polarizers and a multiplicity of birefringent members so arranged as to provide a plurality of superposed channel spectra-producing components, a polarizer being located on each side of said birefringent members, each said birefringent member comprising a first birefringent element of fixed wave retardation characteristics and a second stress-responsive birefringent element capable of having the wave retardation characteristics thereof varied by the application of a stress thereto, the birefringent member of each said channel spectra-producing component following the first component having an effective wave retardation thickness approximately twice that of the preceding birefringent member, said channel spectra-producing component acting to transmit light over narrow, widely spaced bands of the optical spectrum, stress-applying means connected to each of said second stress-responsive elements and capable of applying a predetermined stress to only said second stress-responsive elements of said birefringent members, said stress-applying means being so connected to said stress-responsive elements that each said stress responsive element is maintained by said stress-applying means under a uniform stress over its entire effective light-transmitting area so as to be uniformly birefringent throughout said area, and means for controlling the operation of said stress-applying means to vary the stress applied to said elements, said controlling means being operative, by varying the stress applied to said elements, to change the wave retardation characteristics of said members by not more than approximately one-half wavelength so as to shift the position of the transmission bands of said filter along the spectrum.

8. A tunable, narrow-band, optical filter of the polarization interference type having discrete transmission bands and a relatively wide aperture, said filter comprising a multiplicity of polarizers and a multiplicity of birefringent members so arranged as to provide a plurality of superposed channel spectra-producing components, a polarizer being located on each side of said birefringent members, each said birefringent member comprising a first birefringent element of fixed wave retardation characteristics and a second stress-responsive birefringent element capable of having the wave retardation characteristics thereof varied by the application of a mechanical stress thereto, the birefringent member of each said channel spectra-producing component following the first component having an effective wave retardation thickness approximately twice that of the preceding birefringent member, said channel spectra-producing component acting to transmit light over narrow, widely spaced bands of the optical spectrum, stress-applying means connected to each of said elements and capable of applying a predetermined mechanical stress thereto, said stress-applying means being so connected to said stress-responsive elements that each said stress-responsive element is maintained by said stress-applying means under a uniform stress over its entire effective light-transmitting area so as to be uniformly birefringent throughout said area, and means for controlling the operation of said stress-applying means to vary the stress applied to said elements, said controlling means being operative, by varying the stress applied to said elements, to change the wave retardation characteristics of said members by not more than approximately one-half wavelength so as to shift the position of the transmission bands of said filter along the spectrum.

9. A tunable, narrow-band, optical filter of the polarization interference type having discrete transmission bands and a relatively wide aperture, said filter comprising a multiplicity of polarizers and a multiplicity of birefringent members so arranged as to provide a plurality of superposed channel spectra-producing components, a polarizer being located on each side of said birefringent members, each said birefringent member comprising a first birefringent element of fixed wave retardation characteristics and a second stress-responsive birefringent element capable of having the wave retardation characteristics thereof varied by the application of an electrical field thereto, the birefringent member of each said channel spectra-producing component following the first component having an effective wave retardation thickness approximately twice that of the preceding birefringent member, said channel spectra-producing component acting to transmit light over narrow, widely spaced bands of the optical spectrum, stress-applying means connected to each of said elements and capable of applying a predetermined electrical field thereto, said stress-applying means being so connected to said stress-responsive elements that each said stress-responsive element is maintained by said stress-applying means under a uniform stress over its entire effective light-transmitting area so as to be uniformly birefringent throughout said area, and means for controlling the operation of said stress-applying means to vary the voltage applied to said elements, said control means being operative, by varying the voltage applied to said elements, to change the wave retardation characteristics of said members by not more than approximately one-half wavelength so as to shift the position of the transmission bands of said filter along the spectrum.

10. A tunable, narrow-band, optical filter of the polarization interference type having discrete transmission bands and a relatively wide aperture, said filter comprising a multiplicity of polarizers and a multiplicity of birefringent members so arranged as to provide a plurality of superposed channel spectra-producing components, a polarizer being located on each side of said birefringent members, each said birefringent member comprising at least one stress-responsive birefringent element capable of having the wave retardation characteristics thereof varied by the application of a stress thereto, the birefringent member of each said channel spectra-producing component following the first component having an effective wave retardation thickness approximately twice that of the preceding birefringent member, said channel spectra-producing component acting to transmit light over narrow, widely spaced bands of the optical spectrum, a plurality of stress-applying means, one of said stress-applying means being connected to each of said elements and being capable of applying a uniform predetermined stress thereto to maintain said element uniformly birefringent throughout its effective light-transmitting area, a plurality of means for controlling the operation of each said stress-applying means to vary the stress applied to said elements, said control means being operative to change the wave retardation characteristics of said members by not more than approximately one-half wavelength so as to shift the position of the transmission bands of said filter along the spectrum, and a common control connected to each of said control means for simultaneously operating the latter.

BRUCE H. BILLINGS.

REFERENCES CITED

The following references are of record in the file of this patent:

UNITED STATES PATENTS

| Number | Name | Date |
|---|---|---|
| 2,077,031 | Birchfield | Apr. 13, 1937 |
| 2,163,530 | Thieme | June 20, 1939 |
| 2,174,269 | Land | Sept. 26, 1939 |
| 2,184,999 | Land et al. | Dec. 26, 1939 |
| 2,418,964 | Arenberg | Apr. 15, 1947 |
| 2,493,200 | Land | Jan. 3, 1950 |

OTHER REFERENCES

Ciencia e Investigacion (Argentina), vol. III, September 1947, pages 365 to 373, article by P. J. Evans. Copy in Pan American Union Library.

Annales D'Astrophysique, vol. 7, Nos. 1–2, January–April 1944, pages 3 to 37, article by B. Lyot. Copy in U. S. Naval Observatory Library.